W. W. McCANDLISH.
FEEDER.
APPLICATION FILED NOV. 13, 1913.
1,234,054.
Patented July 17, 1917.
2 SHEETS—SHEET 1.
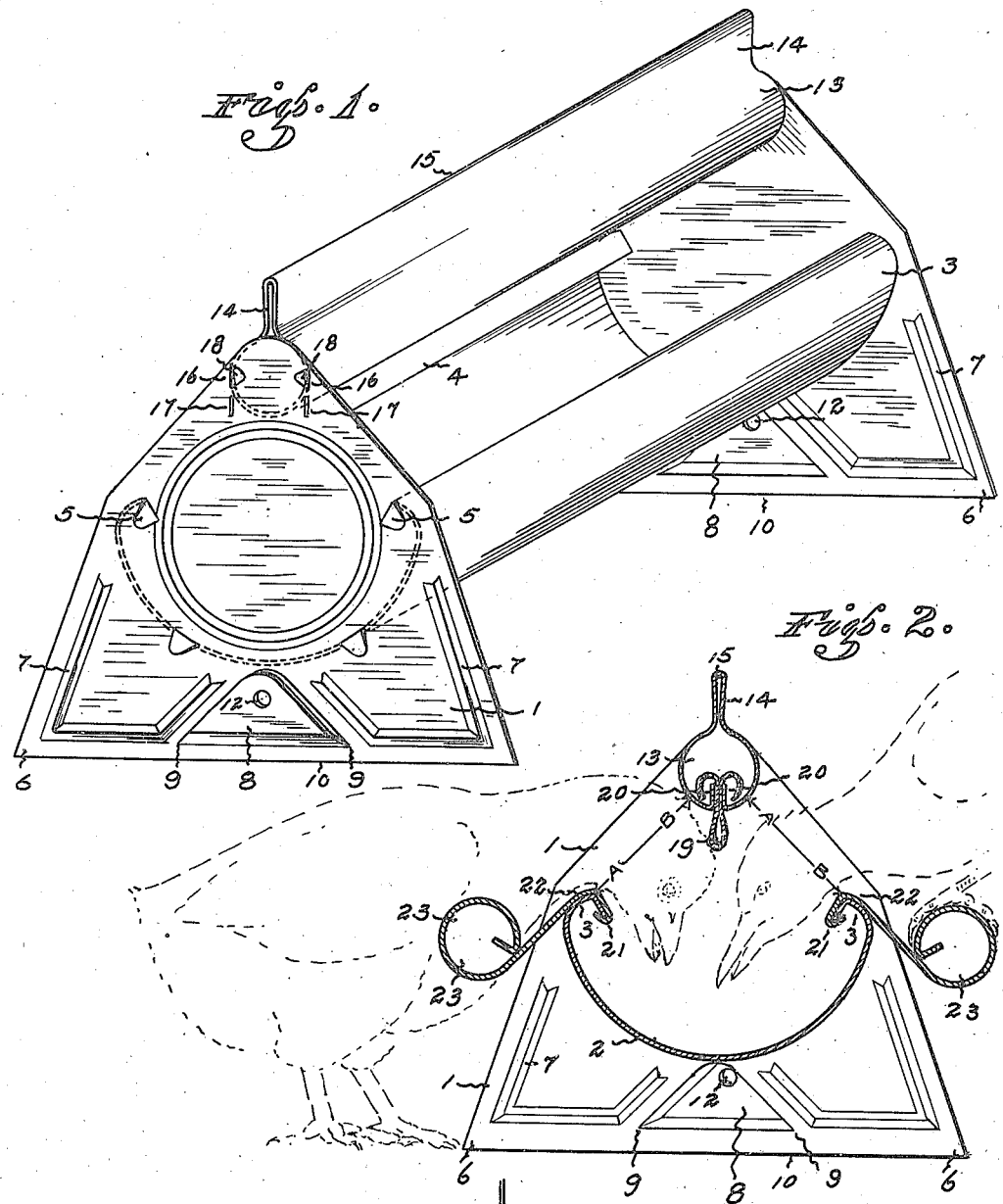
WITNESSES:
INVENTOR.
William W. McCandlish
BY
ATTORNEY

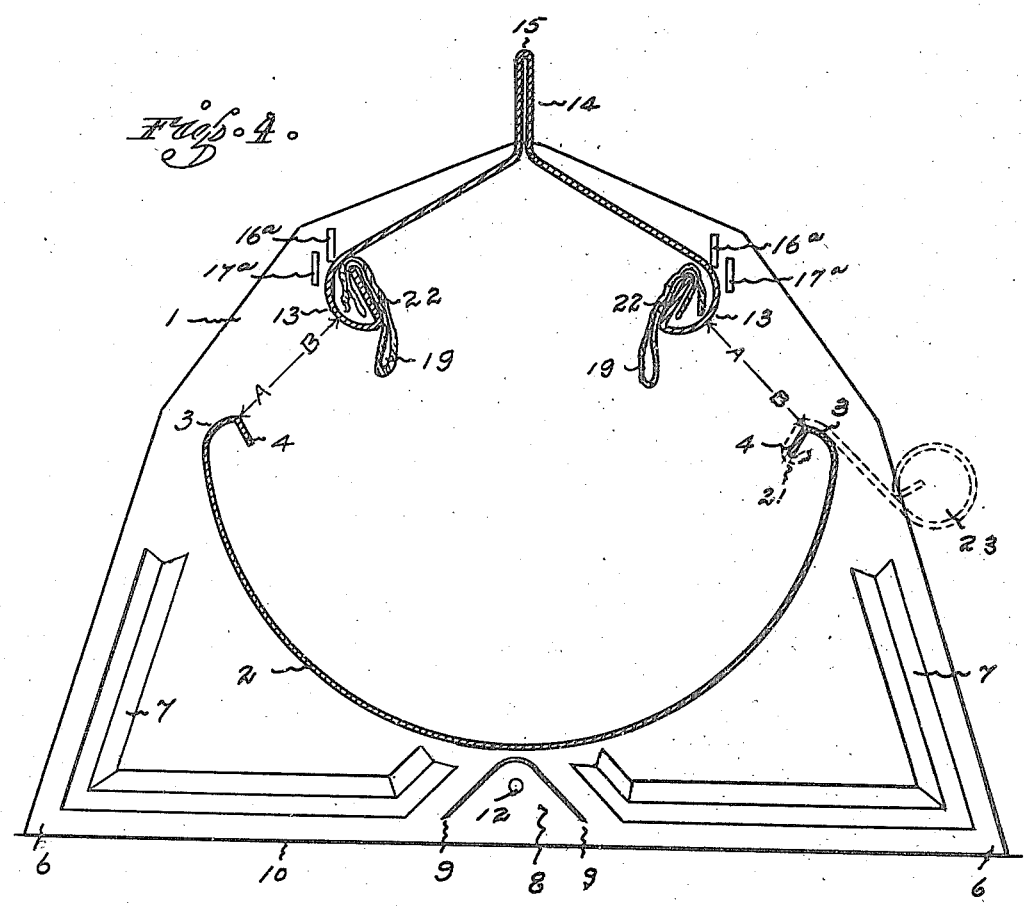

UNITED STATES PATENT OFFICE.

WILLIAM W. McCANDLISH, OF OAKLAND, CALIFORNIA.

FEEDER.

1,234,054.

Specification of Letters Patent.

Patented July 17, 1917.

Application filed November 13, 1913. Serial No. 800,888.

*To all whom it may concern:*

Be it known that I, WILLIAM W. McCANDLISH, a citizen of the United States, and residing at 6025 Shattuck avenue, in the city of Oakland, county of Alameda, State of California, have invented certain new and useful Improvements in Feeders; and I do hereby declare the following to be a full, clear, and exact description of the said invention, such as will enable others skilled in the art to which it most nearly appertains to make, use, and practice the same.

This invention relates more particularly to feed troughs for chickens, birds and domestic fowls.

Objects.

Among the objects of this invention are:—

To provide a feed trough capable of production in cheap durable material, and of such form that it meets all the sanitary demands of this art;

That is easy to fill, and from which the feed cannot be wasted, and is adaptable for liquid or dry feed;

That can be readily nailed down to prevent overturning, if desirable;

That is readily convertible from a "chick" feeder to a bird feeder by a simple attachment;

That provides means for preventing the perching of the fowl above the trough, and for applying medicaments to the heads of the feeding fowl when desired.

The invention possesses other advantageous features, that with the foregoing will be set forth at length in the following description, wherein I shall outline in full that form of the invention selected for illustration in the drawings accompanying and forming part of the present specification. The novelty of the invention will be included in the claims succeeding said description. From this it is apparent that I do not restrict myself to the showing made by said drawings and description, as I may adopt variations within the scope of my invention expressed in said claims.

In the drawings.

Figure 1 is an isometrical perspective of a feeding trough constructed in accordance with this invention.

Fig. 2 is an end elevation, in cross section of the same, having the bird perches attached to the edges of the trough.

Fig. 3 is a fragmentary detail in side elevation illustrating the use of the attaching ears.

Fig. 4 is an end elevation in cross section similar to Fig. 2, illustrating the modification of the guard to suit enlarged troughs without increasing the space A—B.

*Construction.*—In detail the construction illustrated in the drawings, includes the end plates 1—1 between which the trough 2 extends. This trough, like the end plates, is preferably composed of galvanized iron or other suitable noncorrosive sheet material. The trough is approximately semi-circular in cross section, and has the incurling, rolled edges 3—3, with the depending flanges 4—4.

The ends of the trough are preferably secured to the end plates by the tongues 5, inserted through slots punched through the end plates, and bent over to clench the trough to the end plates at each end of the trough. The trough is rendered water tight by soldering the joint between the trough and the end plates; the soldering may be dispensed with in troughs for dry feed.

The end plates may be of any desirable shape, that preferred by me being substantially as shown. The triangular form has the advantage of a wide base, extending laterally as at 6—6 beyond the edges of the trough, making it less liable to overturning, and the apex of the triangle is the proper location for the guard, to preserve its proper relation to the edges of the trough. The end plates are stiffened by the ribs 7 struck up from the body thereof, in any fanciful design best calculated to accomplish the purpose.

The attaching ears 8—8 are preferably triangular in shape, and consists of a portion of the body of the end plates, outlined by punching out the portion by cutting through the plate along the two sides of the triangle, from the apex to the points of conjunction 9—9 with the base line, just above and parallel with the base line 10 of the end plates. These ears 8—8 can then be readily bent downward as in Fig. 3 for attachment to the floor or a wider base by the nail 11, extending through the hole 12 in each ear.

To prevent the fowl from climbing into the trough, the guard 13 is provided. This guard is substantially circular in cross section, and extends parallel with the edges of the trough, between the apices of the end plates. The guard is equally spaced from the edges 3—3, the proper distance to allow easy passage of the head of the fowl, without permitting him to enter the trough with his feet. To prevent the fowl perching upon the guard, it is provided with the upstanding flange 14, preferably composed of a portion of the guard material bent back upon itself to form a smooth edge at 15, to avoid cutting or lacerating the feet, and yet sufficiently uncomfortable to prevent the fowl remaining, this form of guard giving no foot hold. To render the feeder adjustable to the growth of the chicks, the ends may be provided with two or more slots 16—16 and 17—17 to receive the tongues 18—18 provided upon each end of the guard, that may be inserted in the upper or lower sets of holes as desired. If it is desired to fix the guard permanently, the tongs may be clenched, which makes the whole feeder more rigid, owing to the additional bracing effect of the guard.

It often happens that young chicks are afflicted with vermin, that usually confine their activities to the heads of the chicks. To avoid the necessity of handling each chick for the treatment of this distress, the ends of the hollow guard may be sealed and fitted with the proper medicaments, which will be drawn by capillary attraction into the wick 19, inserted between the abutting edges 20—20 of the guard. The heads of the feeding chicks coming into contact with the saturated wick will absorb a sufficient quantity of the oil or other medicament to destroy the vermin. The manner of attaching the ends of the guard to the end plates as described, prevents the rotation or turning of the guard liable to displace the wick from the dependent or operative position.

Description of the invention has been limited by the reference to the feeding of "chicks" because of the bird feeding attachment applicable to the smaller embodiment of the invention. I do not wish to be understood, however, as confining the scope of this invention to that particular form.

It is obvious that the feeder may be made in any size, and modified in many ways within the spirit of this invention, to adapt it to the feeding of all forms of birds and fowls, and wild or domestic animals.

It is a characteristic of birds of flight, that they prefer to feed from a perch, and to render the feeder attractive in aviaries, or in the feeding of wild or game birds, a perch attachment may be combined with the trough. This attachment is preferably formed of a strip of sheet material, similar to that of the feeder. The strip is bent back upon itself at the edge to form the hook 21, adapted to engage the flange 4, continuing the strip is curled to conform at 22 to the contour of the trough edge 3, from which it extends outward in a graceful scroll to form the hollow circular perch 23, spaced a suitable distance from the edge of the trough. Obviously it is preferable to form and attach the perch as described, but it may be applied to the feeder in various ways without departing from the spirit of this invention.

The operation of the invention is disclosed by the chick and bird in dotted lines feeding from the trough in Fig. 2. It is impossible for the fowl to rake the feed from the trough because of the overhanging edges 3—3, and they cannot get into it to scratch the feed out because of the guard, neither can the feeder be upset if it is nailed to the floor by the ears 8—8.

The modification illustrated in Fig. 4 illustrates an enlarged trough, in which the holding capacity is increased, without increasing the distance A—B between the guard and the edges of the trough. This distance is very important and must be carefully preserved with regard to the size of fowl to be fed. By adjusting the guard by attaching it by means of the selected slots 16ª—16ª or 17ª—17ª engaged by the tongues on the guard as previously described; the feeding space A—B can be adjusted to feed every size of fowl from chick and birds to matured domestic fowls and animals.

Having thus described this invention, what I claim and desire to secure by Letters Patent is:

1. A feeder including end plates, a trough secured between said end plates; inturned edges on said trough, a stationary guard between said end plates above said trough having an upstanding flange; and a perch secured to the said inturned edge and spaced from the edge of the trough.

2. A feeder including a trough; downwardly directed inturned edges on said trough, a perch attachable to said inturned edges and spaced therefrom.

3. A feeder including a trough with parallel inturned edges; end plates fixed to said trough; a stationary guard fixed between said end plates above said trough and having an upstanding flange and inturned edges spaced apart.

In testimony whereof, I have hereunto set my hand this 22nd day of October 1913.

WILLIAM W. McCANDLISH.

Witnesses:
BALDWIN VALE,
MARGARET J. McCANDLISH.